(12) United States Patent
Konoshima et al.

(10) Patent No.: US 9,792,561 B2
(45) Date of Patent: Oct. 17, 2017

(54) LEARNING METHOD, INFORMATION CONVERSION DEVICE, AND RECORDING MEDIUM

(71) Applicant: FUJITSU LIMITED, Kawasaki-shi, Kanagawa (JP)

(72) Inventors: Makiko Konoshima, Kawasaki (JP); Yui Noma, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 103 days.

(21) Appl. No.: 14/812,650

(22) Filed: Jul. 29, 2015

(65) Prior Publication Data

US 2015/0332173 A1 Nov. 19, 2015

Related U.S. Application Data

(63) Continuation of application No. PCT/JP2013/052397, filed on Feb. 1, 2013.

(51) Int. Cl.
*G06N 99/00* (2010.01)
*G06F 17/16* (2006.01)
*G06N 7/06* (2006.01)

(52) U.S. Cl.
CPC ........... *G06N 99/005* (2013.01); *G06F 17/16* (2013.01); *G06N 7/06* (2013.01)

(58) Field of Classification Search
CPC .................................................. G06N 99/005
USPC ......................................................... 706/12
See application file for complete search history.

(56) References Cited

U.S. PATENT DOCUMENTS

2007/0130188 A1  6/2007  Moon et al.

FOREIGN PATENT DOCUMENTS

| JP | 2006-252333 | 9/2006 |
|---|---|---|
| JP | 2007-004458 | 1/2007 |
| JP | 2010-061176 | 3/2010 |
| JP | 2011-221689 | 11/2011 |

OTHER PUBLICATIONS

Liu et al ("Compact Hyperplane Hashing with Bilinear Functions" Jun. 2012).*
("Precision and recall" From Wikipedia, the free encyclopedia. Retrieved Apr. 13, 2017).*

(Continued)

*Primary Examiner* — Lut Wong
(74) *Attorney, Agent, or Firm* — Staas & Halsey LLP

(57) ABSTRACT

A learning method includes: counting any one of or some of the number of labels added to each of feature amount vectors included in a learning data set, the number of types of the label, the number of feature amount vectors added with the same label, and the number of data pairs used for learning of a hyperplane, by a processor; first selecting, according to a result of the counting, one or more generation methods from a plurality of previously stored generation methods that generate the data pairs from the learning data set, by the processor; generating, using the selected generation methods, the data pairs from the feature amount vectors included in the learning data set, by the processor; and first learning, using the generated data pairs, the hyperplane that divides a feature amount vector space, by the processor.

6 Claims, 13 Drawing Sheets

(56) References Cited

OTHER PUBLICATIONS

International Search Report dated Mar. 19, 2013 in corresponding international application PCT/JP2013/052397.
Datar, Mayur, et al., "Locality-Sensitive Hashing Scheme Based on p-Stable Distributions", SCG '04 Proceedings of the twentieth annual symposium on Computational geometry, pp. 253-262, Jun. 9, 2004.
Norouzi, Mohammad et al., "Minimal Loss Hashing for Compact Binary Codes", Proceedings of the 28th International Conference on Machine Learning, Jun. 28, 2011.
Gilad-Bachrach, Ran et al., "Margin Based Feature Selection—Theory and Algorithms", Proceedings of the 21st International Conference on Machine Learning, Jul. 4, 2004.
Konoshima, Makiko, et al., "Locality-Sensitive Hashing with Margin Based Feature Selection", IEICE Technical Report, Jun. 12, 2012, vol. 112, No. 83, p. 41-47.
Konoshima, Makiko, Locality-Sensitive Hashing with Margin Based Feature Selection, [Online] p. 1-9, Retrieved from the Internet on Mar. 5, 2013: URL:http://arxiv.org/pdf/1209.5833v2.
Extended European Search Report dated Mar. 7, 2017 in corresponding European Patent Application No. 13873979.2.
Makiko Konoshima et al., "Hyperplane Arrangements and Locality-Sensitive Hashing with Lift", Dec. 26, 2012, pp. 1-16, Retrieved from URL http://arxiv.org/pdf/1212.6110.pdf.

\* cited by examiner

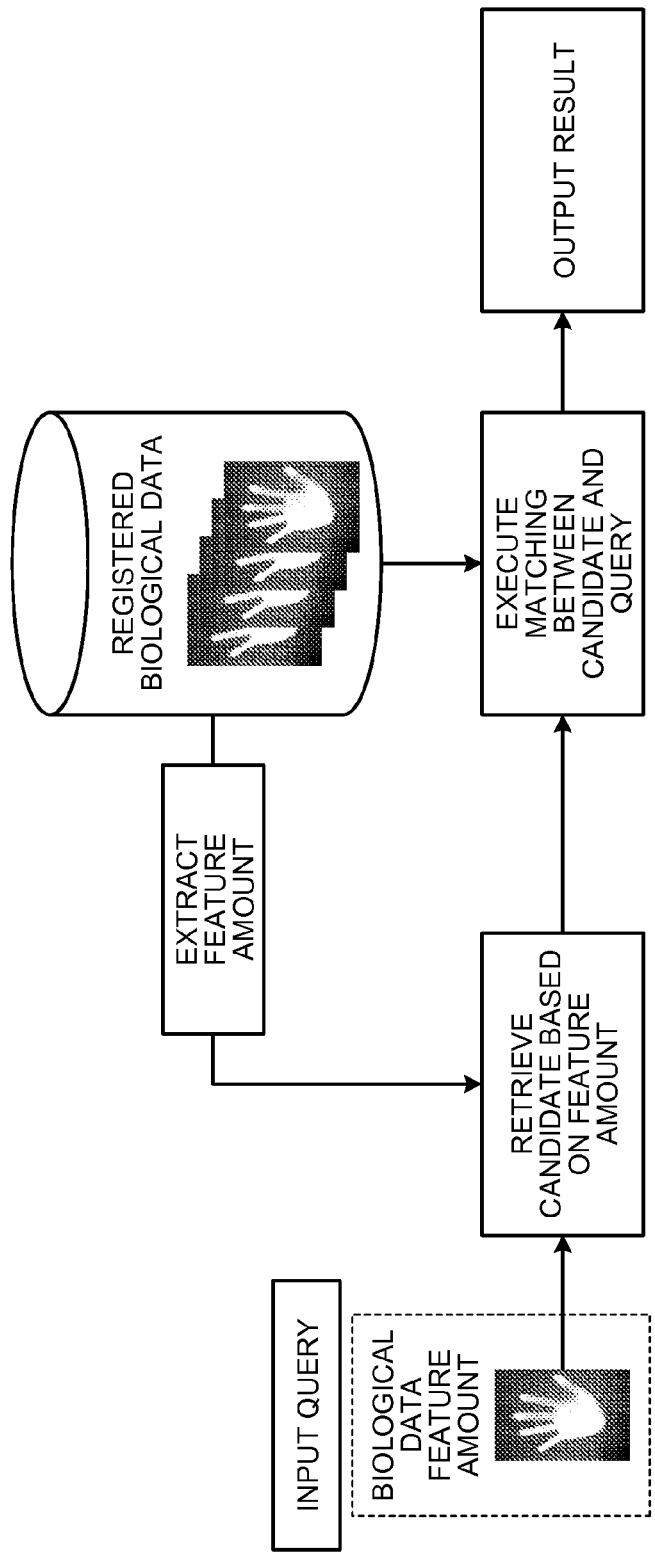

FIG.3

| STATISTICAL PROPERTY OF DATA SET AND INPUT PARAMETER | | | | OPTIMUM LEARNING DATA PAIR GENERATION METHOD |
|---|---|---|---|---|
| NUMBER OF LABELS | NUMBER OF TYPES OF LABEL | NUMBER OF DATA ADDED WITH SAME LABEL | NUMBER OF LEARNING DATA PAIRS | |
| ONE DATA ADDED WITH ONE LABEL | SMALL | LARGE | NOT CONSIDERED | Randomhit-Randommiss OR Farhit-Nearmiss |
| ONE DATA ADDED WITH ONE LABEL | LARGE | SMALL | NOT CONSIDERED | Randomhit-Nearmiss |
| ONE DATA ADDED WITH PLURALITY OF LABELS | LARGE | SMALL | LARGE | Randomhit-Boundarymiss |
| OTHER THAN ABOVE | | | | Nearhit-Nearmiss |

| DATA ID | VECTOR FEATURE AMOUNT | LABEL |
|---|---|---|
| 1 | a, b, c… | A |
| 2 | d, e, f… | B |
| ⋮ | ⋮ | ⋮ |

LEARNING METHOD, INFORMATION CONVERSION DEVICE, AND RECORDING MEDIUM

CROSS-REFERENCE TO RELATED APPLICATION

This application is a continuation application of International Application PCT/JP2013/052397, filed on Feb. 1, 2013, and designating the U.S., the entire contents of which are incorporated herein by reference.

FIELD

The present invention relates to a learning method, an information conversion device, and a learning program.

BACKGROUND

There is conventionally known a technology that accelerates retrieval processing by relaxing strictness when feature amount vectors indicative of a feature of data, such as a fingerprint, an image, a voice, are used to retrieve similar data. As an example of such a technology, there is known a method that reduces calculation cost by converting the feature amount vectors into binary strings while holding a distance relationship between the feature amount vectors and calculating a hamming distance between the binary strings.

Further, there is known LSH (Locality-Sensitive Hashing) technology as the method that converts the feature amount vectors into the binary strings while holding the distance relationship between the feature amount vectors. For example, an information processing device sets a plurality of hyperplanes that divide a feature amount vector space and converts the feature amount vectors into the binary strings each indicative of whether an inner product between a normal vector and feature amount vector in each hyperplane is positive or negative. That is, information processing device uses the hyperplane to divide the feature amount vector space into a plurality of areas and converts the feature amount vectors into the binary strings indicative of to which one of the areas the feature amount vector belongs.

When a label indicative of similarity, such an ID for identifying an individual who makes data registration, is added to each data, it is desirable to set the hyperplane that classifies the data for each label in order to facilitate classification of data to be newly registered. To this end, there are available multiple technologies that uses a predetermined method to select a data pair for learning from the feature amount vectors added with the label and use the selected learning data pair to learn the hyperplane that divides the data for each label.

For example, the information processing device randomly selects, from among feature amount vectors to be classified, two feature amount vectors (hereinafter, referred to as "positive example pair") added with the same label and two feature amount vectors (hereinafter, referred to as "negative example pair") added with different labels. Then, the information processing device repetitively optimizes the hyperplane so as to reduce a hamming distance between the positive example pair and to increase a hamming distance between the negative example pair to thereby learn the hyperplane that classifies the data for each label.

In another method, the information processing device randomly selects one reference vector. Then, the information processing device defines, as the positive example pair, a feature amount vector that is most similar to the reference vector among feature amount vectors added with the same label as the label of the reference vector and the reference vector. Further, the information processing device defines, as the negative example pair, a feature amount vector that is most similar to the reference vector among feature amount vectors added with the different label from the label of the reference vector and the reference vector. Then, the information processing device repetitively optimizes the hyperplane so as to reduce the hamming distance between the positive example pair and to increase the hamming distance between the negative example pair.

Non Patent Document 1: M. Datar, N. Immorlica, P. Indyk, V. S. Mirrokni: Locality-Sensitive Hashing Scheme Based on p-Stable Distributions, Proceedings of the twentieth annual symposium on Computational geometry (SCG 2004)

Non Patent Document 2: M. Norouzi and D. Fleet: Minimal Loss hashing for compact binary codes, Proceedings of the 28th International Conference on Machine Learning (ICML '11)

Non Patent Document 3: Ran Gilad-Bachrachy, Amir Navotz Naftali Tishbyy: Margin Based Feature Selection—Theory and Algorithms (ICML 2004)

However, the above technologies for learning the above-mentioned hyperplane select the learning data pair by using a prescribed method irrespective of a statistical property that a data set has, so that accuracy with which the hyperplane classifies the data may degrade.

That is, a data set to be classified has different statistical properties in accordance with the number of data, distribution of data, the number of labels added, and the like. Thus, different methods are used to select an adequate learning data pair depending on the statistical property of the data set to be classified. However, the technology that selects the learning data pair by using a prescribed method irrespective of the statistical property of the data set may select an inadequate data pair. When the inadequate data pair is used to learn the hyperplane, accuracy with which the hyperplane classifies the data may degrade.

SUMMARY

According to an aspect of the embodiments, a learning method includes: counting any one of or some of the number of labels added to each of feature amount vectors included in a learning data set, the number of types of the label, the number of feature amount vectors added with the same label, and the number of data pairs used for learning of a hyperplane, by a processor; first selecting, according to a result of the counting, one or more generation methods from a plurality of previously stored generation methods that generate the data pairs from the learning data set, by the processor; generating, using the selected generation methods, the data pairs from the feature amount vectors included in the learning data set, by the processor; and first learning, using the generated data pairs, the hyperplane that divides a feature amount vector space, by the processor.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a view for explaining an example of biometric authentication;

FIG. 3 is a view for explaining a relationship between a statistical property of a feature amount vector and an optimum generation method;

DESCRIPTION OF EMBODIMENTS

Hereinafter, a learning method, an information conversion device, and a learning program according to the present application will be described with reference to the accompanying drawings.

First Embodiment

Figure 1:
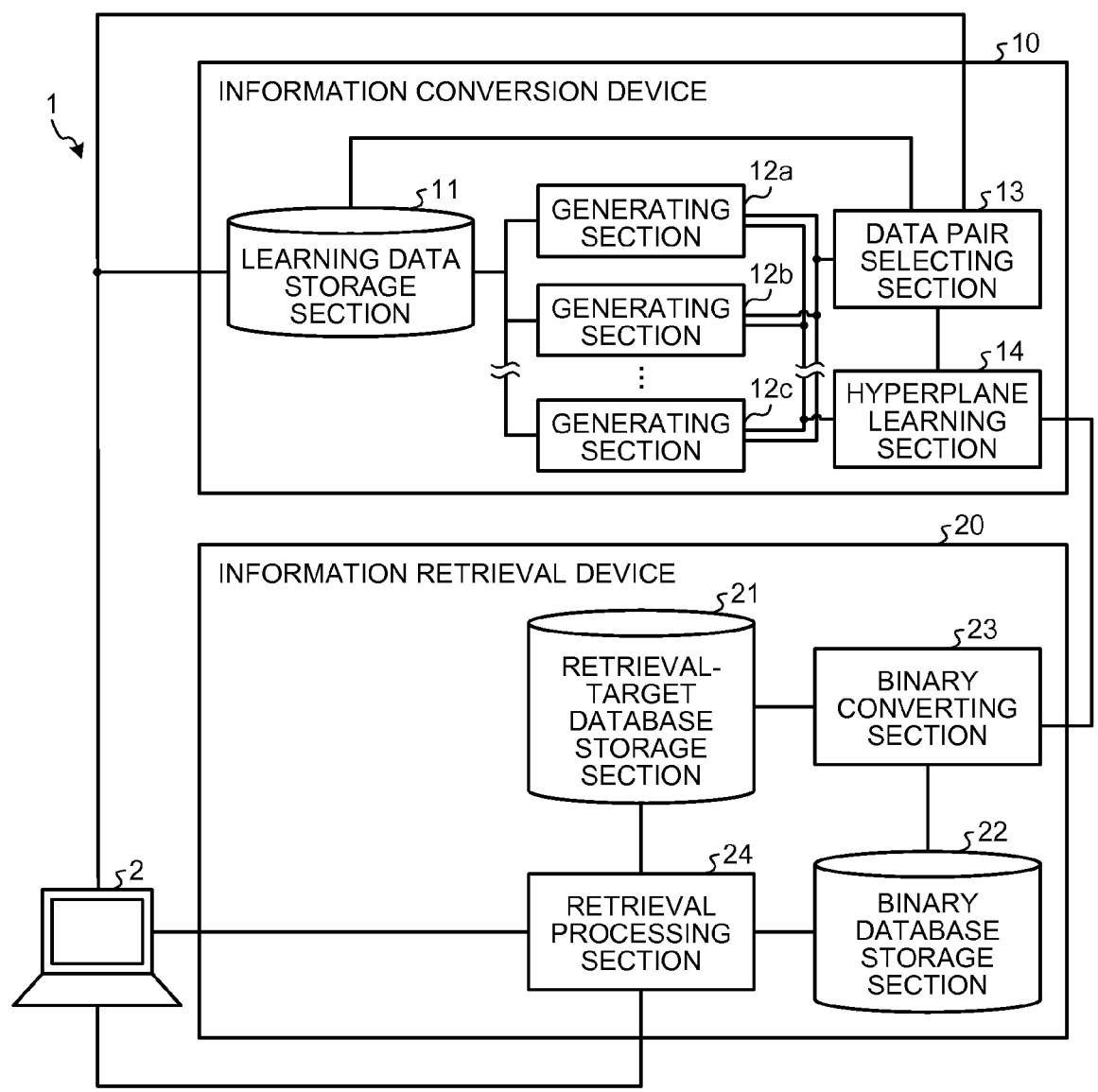
FIG. 1 is a view for explaining a retrieval system according to a first embodiment.

In a first embodiment described below, an example of a retrieval system having an information conversion device will be described using FIG. 1. FIG. 1 is a view for explaining a retrieval system according to the first embodiment. As illustrated in FIG. 1, a retrieval system 1 includes a client device 2, an information conversion device 10, and an information retrieval device 20.

The information conversion device 10 includes a plurality of generating sections 12a to 12c, a data pair selecting section 13, and a hyperplane learning section 14. The information retrieval device 20 includes a retrieval-target database storage section 21, a binary converting section 23, a binary database storage section 22, and a retrieval processing section 24.

The retrieval system 1 illustrated in FIG. 1 retrieves, upon receiving query data from the client device 2, neighborhood data of the query data from the retrieval-target database storage section 21. Then, the retrieval system 1 notifies the client device 2 of whether or not similar data has been registered in the vicinity of the query data. Specifically, in the retrieval system 1, the information retrieval device 20 uses a conversion matrix generated by the information conversion device 10 to convert retrieval target data to into a binary string and uses the obtained binary string to retrieve the neighborhood data of the query data.

The retrieval target data in the retrieval system 1 is, for example, image data or voice data, which is biological data for biometric authentication that uses a fingerprint pattern or a vein pattern. That is, the retrieval system 1 determines, upon receiving biological data of a user input to the client device 2 as the query data, whether or not the biological data of the user has been registered.

There have been proposed various types of the feature amounts for image or voice data. However, the retrieval system 1 does not depend on specific types of the feature amounts, so that the retrieval system 1 can use any types of the feature amounts. For example, a SIFT feature amount, a SURF feature amount or the like, which is generally used as a feature amount for an image, may be used as a feature amount. Feature amounts of these types are known as feature amounts that are robust against hiding and variation as a result of using local information in an image as a feature amount vector. The feature amount vector in any form that indicates such feature amounts may be used.

FIG. 2 is a view for explaining an example of biometric authentication. Note that the example of FIG. 2 represents processing in ID-less 1: N authentication, where information such as an ID (Identification) of a user is not input, and no narrowing down of biological data by using the ID of the user is involved. As illustrated in FIG. 2, the retrieval system 1 stores a plurality of registered biological data that have been registered by a plurality of users.

Then, upon receiving the biological data as the query data from the client device 2, the retrieval system 1 extracts a feature amount vector indicating the feature amount of the input biological data and then retrieves the registered biological data that has a feature amount vector similar to the extracted feature amount vector. That is, the retrieval system 1 determines whether or not the registered biological data of a user who has input the query data has been registered.

Further, the retrieval system 1 generates a conversion matrix for converting a feature amount vector into a binary string having a predetermined bit length, and then uses the obtained conversion matrix to convert the feature amount vector of the registered biological data into a binary string. Additionally, the retrieval system 1 converts, into a binary string having the predetermined bit length, the feature amount vector corresponding to the biological data that has been input as the query data and calculates the hamming distance thereof from the binary string obtained by converting the feature amount vector of the registered biological data.

Then, the retrieval system 1 extracts, as a retrieval target candidate, the registered biological data that has the hamming distance not exceeding a predetermined threshold. Thereafter, the retrieval system 1 executes strict matching processing between the retrieved registered biological data and the biological data input as the query data and outputs an execution result to the client device 2.

Note that, in a case where the input biological data and the registered biological data are in the form of image, the feature amount vector is obtained by vectorizing, for example, values representing a direction, a length and a slope of a ridge in a specific area within each image, and a density and coordinates of characteristic points, such as a terminal and a branching point, of the ridge. On the other hand, in a case where the input biological data and the registered biological data are in the form of voice, the feature amount vector is obtained by vectorizing values representing a distribution, a level of strength, and a peak value of a frequency component.

The following describes processing to be executed by the information conversion device 10 and processing to be executed by the information retrieval device 20. Referring back to FIG. 1, the information conversion device 10 uses learning data stored in a learning data storage section 11 to generate a conversion matrix that converts a feature amount vector into a binary string having a predetermined bit length and notifies the information retrieval device 20 of the generated conversion matrix.

The conversion matrix is a matrix having, as a row component, a normal vector of a hyperplane that divides a feature amount vector space into a plurality of areas and a matrix that the information retrieval device 20 uses to convert the feature amount vector into the binary string. For example, the information retrieval device 20 calculates a product between the conversion matrix and feature amount vector. Then, the information retrieval device 20 determines whether a value of each component of the calculated product is positive or negative and generates a binary string including "1" as a positive value and "0" as a negative value. That is, the information retrieval device 20 uses the conversion matrix to convert the feature amount vector into the binary string indicating to which one of a plurality of areas of the feature amount vector space divided by the hyperplane each feature amount vector belongs.

It is desirable to set the hyperplane that classifies data for each label in order to facilitate classification of data to be newly registered. To this end, the information conversion device 10 generates, from the feature amount vectors stored in the learning data storage section 11, a positive example pair which is a set of the feature amount vectors added with the same label and a negative example pair which is a set of the feature amount vectors added with different labels. Then, the information conversion device 10 uses the generated positive example pair and negative example pair to evaluate a plurality of set hyperplanes at the same time for optimization of the hyperplane.

There are known various methods of selecting the positive example pair and negative example pair that optimize the hyperplane. Hereinafter, as the method of selecting the positive example pair and negative example pair, a Randomhit-Randommiss (RR) method, a Farhit-Nearmiss (FN) method, and a Randomhit-Nearmiss (RN) method will be described. Additionally, as the method of selecting the positive example pair and negative example pair, a Randomhit-Boundarymiss (RB) method and a Nearhit-Nearmiss (NN) method will be described.

In the Randomhit-Randommiss method, randomly selected two feature amount vectors are selected from the feature amount vectors added with the same label as the positive example pair; and randomly selected two feature amount vectors are selected from the feature amount vectors added with the different labels as the negative example pair.

In the Farhit-Nearmiss method, a feature amount vector serving as a reference is selected, and a feature amount vector that is most distant from the feature amount vector serving as a reference among feature amount vectors added with the same label as the label of the feature amount vector serving as a reference and the feature amount vector serving as a reference are defined as the positive example pair; and a feature amount vector that is closest to the feature amount vector serving as a reference among feature amount vectors added with the different label from the label of the feature amount vector serving as a reference and the feature amount vector serving as a reference are defined as the negative example pair.

In the Randomhit-Nearmiss method, a pair randomly selected from the feature amount vectors added with the same label is defined as the positive example pair; and a feature amount vector serving as a reference is selected, and a feature amount vector that is closest to the feature amount vector serving as a reference among feature amount vectors added with the different label from the label of the feature amount vector serving as a reference and the feature amount vector serving as a reference are defined as the negative example pair.

In the Randomhit-Boundarymiss method, a pair randomly selected from the feature amount vectors added with the same label is defined as the positive example pair; and one feature amount vector is randomly selected as a sample, then a feature amount vector that is closest to the sample feature amount vector among the feature amount vectors that are not added with the same label as the label of the sample feature amount vector is selected as a reference vector, and a feature amount vector that is closest to the reference vector among feature amount vectors added with the different label from the label of the reference vector and the reference vector are defined as the negative example pair.

In the Nearhit-Nearmiss method, a feature amount vector serving as a reference is selected, and a feature amount vector that is closest to the feature amount vector serving as a reference among feature amount vectors added with the same label as the label of the feature amount vector serving as a reference and the feature amount vector serving as a reference are defined as the positive example pair; and a feature amount vector that is closest to the feature amount vector serving as a reference among feature amount vectors added with the different label from the label of the feature amount vector serving as a reference and the feature amount vector serving as a reference are defined as the negative example pair.

The feature amount vector classified by the hyperplane has different statistical properties depending on a type thereof. For example, the statistical property of the feature amount vector differs depending on a type of data as a source of the feature amount vector, such as voice data, image data, or biological information. More specifically, the number of labels added to one feature amount vector, the number of types of the label added to all feature amount vectors, the number of feature amount vectors added with the same label, the number of data pairs used for learning of the hyperplane, and the like differ depending on the data type.

Further, a data pair used in learning the hyperplane differs depending on a generation method thereof. Thus, accuracy with which the hyperplane classifies the feature amount vectors or performance of neighborhood retrieval by the binary string generated using the normal vector of the hyperplane changes according to the statistical property of the feature amount vector and generation method of the data pair used in learning the hyperplane. Thus, the information conversion device 10 selects one or more generation methods from a plurality of previously stored generation methods according to the statistical property of the feature amount vector and uses data pairs generated by the selected generation methods to perform learning of the hyperplane.

Further, in a method that sets a threshold for the statistical property and selects one generation method according to whether or not the statistical property is larger than the set threshold, it is requested to set a threshold that accurately segments the property of the feature amount vector, which is difficult to realize. Further, in a case where a feature amount vector added separately from a feature amount vector used in the learning has a property different from the label of the feature amount vector used in the learning, accuracy with which the hyperplane classifies the feature amount vectors may degrade. Thus, the information conversion device 10 does not set the threshold, but selects, at a ratio according to the counted numbers of the statistical properties, data pairs generated by the generation methods and uses the selected data pairs to learn the hyperplane.

The following describes, using FIG. 3, the data pair generation method that the information conversion device 10 selects according to the statistical property of the feature amount vector. FIG. 3 is a view for explaining a relationship between the statistical property of the feature amount vector and an optimum generation method. The information conversion device 10 counts, for example, the number of labels added to each feature amount vector, the number of types of the label added to all feature amount vectors, the number of feature amount vectors added with the same label, and the number of data pairs used for learning of the hyperplane. Then, the information conversion device 10 selects the data pair generation methods from previously stored generation methods based on a ratio according to the number of types of all labels, a ratio according to the number of data added with the same label, and a ratio according to the number of the learning data pairs.

More specifically, for the feature amount vectors each added with one label, the information conversion device 10 increases the number of data pairs generated by the RR method or FN method as the number of types of all the labels is smaller and the number of data added with the same label is larger. Further, for the feature amount vectors each added with one label, the information conversion device 10 increases the number of data pairs generated by the RN method as the number of types of all the labels is larger and the number of data added with the same label is smaller.

Further, for the feature amount vectors each added with a plurality of labels, the information conversion device 10 increases the number of data pairs generated by the RB method as the number of types of all the labels is larger, the number of data added with the same label is smaller, and the number of data pairs used in learning is larger. The information conversion device 10 uses a data pair generated by the NN method at a ratio obtained by subtracting the ratios of the number of data pairs generated by the RR method or FN method, RN method, and RM method from 1.

Figures 4, 5:
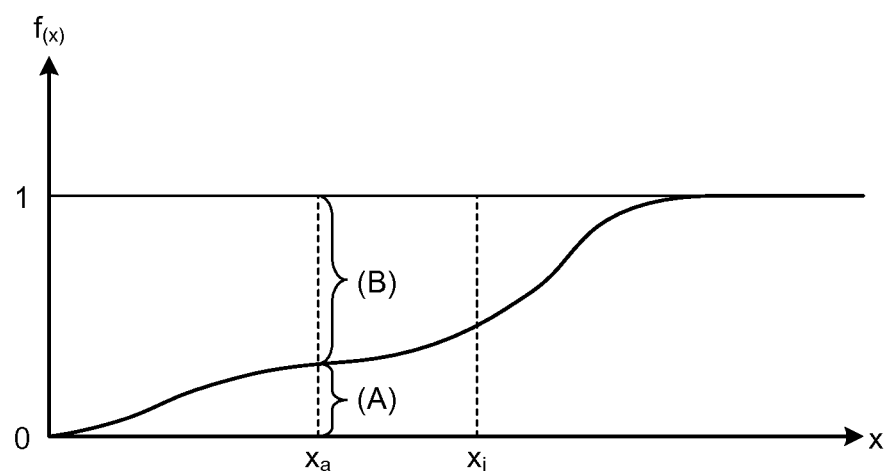
FIG. 4 is a view for explaining a calculation method of calculating a ratio that an information conversion device uses.
FIG. 5 is a view for explaining an example of data stored in a learning data storage section.

The following describes, using FIG. 4, a calculation method of calculating the ratio of the number of the data pairs to be generated by each of the generation methods to the total number of data pairs to be used in the information conversion device 10. FIG. 4 is a view for explaining a calculation method of calculating a ratio that the information conversion device uses. In the example of FIG. 4, a value of a function f(x) that the information conversion device 10 uses is plotted on a vertical axis, and a value of an argument x is plotted on a horizontal axis.

For example, the information conversion device 10 calculates the ratio using a predetermined function whose value is defined by a first argument and a second argument. A function that the information conversion device 10 uses here is a function in which the value for the first argument is monotonously non-decreasing such that it becomes 0 when the first argument is negative infinity and becomes 1 when the first argument is positive infinity. Further, the function that the information conversion device 10 uses is a function in which a lower limit of the first argument for which the value is equal to or larger than ½ is defined as the second argument. That is, in the example of FIG. 4, a value $x_j$ of the first argument for which a value of f(x) is ½ is defined as the second argument. An example of a function that satisfies such conditions is a sigmoid function represented by $f(x) = 1/(1+e^{-ax})$, in which the argument x is a difference between the first and second arguments. Note that "a" is a value called "gain", which is a value set as a parameter.

The following describes, using FIG. 4, an example in which the information conversion device 10 calculates a ratio according to the number of types of the label. Note that a ratio calculated in the following description is a ratio calculated according the number of types of the label, which is one of the ratios of the number of data pairs generated by the generation methods and to be used in the information conversion device 10 and thus differs from a ratio of the number of the data pairs used actually. That is, the information conversion device 10 calculates a ratio of the number of the data pairs to be used for learning of the hyperplane in consideration of ratios based on the other statistical properties which have been calculated according to the same method.

For example, in a case where the number of types of the label is $X_a$, the information conversion device 10 sets a ratio indicated by (A) in FIG. 4 as a ratio of the number of data pairs generated by the RN method to the total number of data pairs to be selected and sets a ratio indicated by (B) in FIG. 4 as a ratio of the number of data pairs generated by the RR method or FN method to the total number of data pairs to be selected. Further, in a function defined by the second argument, the information conversion device 10 sets the ratio indicated by (A) in FIG. 4 as a ratio of the number of data pairs generated by the NN method to the total number of data pairs to be selected and sets the ratio indicated by (B) in FIG. 4 as a ratio of the number of data pairs generated by the RB method to the total number of data pairs to be selected. Similarly, the information conversion device 10 selects, according to the ratio calculated for each counted numerical value of each of the other statistical properties, the data pairs generated by the generation methods.

Thereafter, the information conversion device 10 uses the data pairs generated by the generation methods to learn the hyperplane and notifies the information retrieval device 20 of the conversion matrix consisting of normal vectors of the leaned hyperplane. Note that the information conversion device 10 may select a generation method using the threshold by using a heavy-side step function.

Referring back to FIG. 1, processing to be performed by the learning data storage section 11, the generating sections 12a to 12c, the data pair selecting section 13, and the hyperplane learning section 14 which are provided in the information conversion device 10 will be described. The learning data storage section 11 stores learning data for the information conversion device 10 to learn the hyperplane.

Specifically, the learning data storage section 11 stores, as the learning data, a plurality of feature amount vectors for each user. The feature amount vector stored in the learning data storage section 11 is some of the feature amount vectors stored in the retrieval-target database storage section 21 to be described later and feature amount vectors registered from the client device 2. That is, the learning data storage section 11 stores some of the feature amount vectors corresponding to the registered biological data registered in the retrieval system 1.

FIG. 5 is a view for explaining an example of data stored in the learning data storage section. As illustrated in FIG. 5, the learning data storage section 11 stores a data ID (Identification), a feature amount vector, and a label in association with each other. The data ID is a data identifier added to each data. The label is information indicating similarity between the feature amount vectors. For example, the label is information indicating a user who has registered his or her biological data or the like and serving as a source of each feature amount vector.

For example, in the example of FIG. 5, the learning data storage section 11 stores 4,000 dimensional floating-point data "a, b, c, . . . " added with a label "A" which is a feature amount vector represented by a data ID "1". Further, the learning data storage section 11 stores 4,000 dimensional floating-point data "d, e, f, . . . " added with a label "B" which is a feature amount vector represented by a data ID "2".

Referring back to FIG. 1, the generating sections 12a to 12c generate the learning data pairs from the feature amount vectors stored in the learning data storage section 11 according to different generation methods, respectively. For example, the generating section 12a generates the data pairs from the feature amount vectors stored in the learning data storage section 11 using the RR method and outputs the generated data pairs to the hyperplane learning section 14.

The generating section 12b outputs the data pairs generated using the FN method to the hyperplane learning section 14. The generating section 12c outputs the data pairs generated from the feature amount vectors stored in the learning data storage section 11 using the RN method to the hyperplane learning section 14.

Although omitted in FIG. 1, the information conversion device 10 has, in addition to the generating sections 12a to 12c, a generating section that generates the data pairs using the RB method and a generating section that generates the data pairs using the NN method. Further, when instructed by the data pair selecting section 13 to generate the data pairs, each of the generating sections 12a to 12c generates a set of data pairs including one positive example pair and one negative example pair and outputs the generated set of data pairs to the hyperplane learning section 14.

The data pair selecting section 13 analyzes the learning data storage section 11 and counts each statistical property. The data pair selecting section 13 calculates the number of data pairs generated by the generating sections 12a to 12c based on the counted statistical properties. Hereinafter, details of processing to be executed by the data pair selecting section 13 will be described.

The data pair selecting section 13 counts the number "L" of types of the label added to the feature amount vectors stored in the learning data storage section 11. Further, the data pair selecting section 13 counts the numbers "N1" to "NL" of feature amount vectors added with the labels for each label. Further, the data pair selecting section 13 counts a total number Nall of feature amount vectors stored in the learning data storage section 11. Then, the data pair selecting section 13 acquires values of: three parameters "TH1", "TH2", "TH3"; three gains "gain1", "gain2", "gain3"; and Npair indicating the number of data pairs used in learning of the hyperplane from the client device 2.

The data pair selecting section 13 then prepares three sigmoid functions "f_1", "f_2", and "f_3" and sets the acquired values of "gain1", "gain2", and "gain3" as the gain values of the sigmoid functions "f_1", "f_2", and "f_3", respectively. Note that the second argument used when the ratio of the number of the data pairs to be generated by each of the generation methods to the total number of data pairs to be used is calculated is defined from the value of each parameter and value of each gain. Hereinafter, the first argument of each of the sigmoid functions "f_1", "f_2", and "f_3" is referred to as x.

The data pair selecting section 13 calculates a standard deviation std(Ni) among the counted "N1" to "NL". Further, the data pair selecting section 13 assumes a lower limit of the first argument x for which a value of the sigmoid function "f_1" is equal to or larger than 0.1 as "y_i" and assumes a lower limit of the first argument x for which a value of the sigmoid function "f_1" is equal to or larger than 0.9 as "z_i". Then, the data pair selecting section 13 changes the gain of the sigmoid function "f_1" such that the sigmoid function "f_1" satisfies "z_i−y_1=std(Ni)/Nall".

The data pair selecting section 13 samples three values "a1", "a2", and "a3" from a uniform distribution on [0, 1]. Then, the data pair selecting section 13 determines whether or not each of the feature amount vectors stored in the learning data storage section 11 is added with one label. When each feature amount vector is added with one label, the data pair selecting section 13 executes the following processing.

The data pair selecting section 13 calculates a value of the sigmoid function "f_1" having "L/Nall" as the first argument and "TH1" as the second argument and a value of the sigmoid function "f_2" having "L" as the first argument and "TH2" as the second argument. Then, the data pair selecting section 13 determines whether the sigmoid function "f_1" is larger than "a1" and a value of "a2" is equal or larger than the value of "f_2".

When the sigmoid function "f_1" is larger than "a1" and a value of "a2" is equal or larger than the value of "f_2", the data pair selecting section 13 adopts the data pair generated by the RR method. More specifically, the data pair selecting section 13 makes the generating section 12a that generates the data pair using the RR method generate one set of data pairs and output the generated data pairs to the hyperplane learning section 14.

Further, when the sigmoid function "f_1" is larger than "a1" and the value of "a2" is not equal to or larger than the value of "f_2", the data pair selecting section 13 determines whether "a1" is equal to or larger than the value of the sigmoid function "f_1" and value of "a2" is smaller than the value of "f_2". Then, when "a1" is equal to or larger than the value of the sigmoid function "f_1" and value of "a2" is smaller than the value of "f_2", the data pair selecting section 13 adopts the data pair generated by the RN method. More specifically, the data pair selecting section 13 makes the generating section 12c that generates the data pair using the RN method generate one set of data pairs and output the generated data pairs to the hyperplane learning section 14.

Further, when "a1" is not equal to or larger than the value of the sigmoid function "f_1" or value of "a2" is not smaller than the value of "f_2", the data pair selecting section 13 adopts the data pair generated by the FN method. More specifically, the data pair selecting section 13 makes the generating section 12b that generates the data pair using the FN method generate one set of data pair and output the generated data pairs to the hyperplane learning section 14.

On the other hand, when each feature amount vector is added with a plurality of labels, the data pair selecting section 13 executes the following processing.

The data pair selecting section 13 calculates a value of the sigmoid function "f_1" having "L/Nall" as the first argument and "TH1" as the second argument and a value of the sigmoid function "f_2" having "L" as the first argument and "TH2" as the second argument. Further, the data pair selecting section 13 calculates a value of the sigmoid function "f_3" having "Npair/Nall" as the first argument and "TH3" as the second argument. Then, the data pair selecting section 13 determines whether the value of "a1" is equal to or larger than the sigmoid function "f_1", the value of "a2" is smaller than the value of "f_2", and a value of "a3" is equal to or smaller than the value of the sigmoid function "f_3".

When the value of "a1" is equal to or larger than the sigmoid function "f_1", the value of "a2" is smaller than the value of "f_2", and a value of "a3" is equal to or smaller than the value of the sigmoid function "f_3", the data pair selecting section 13 adopts the data pair generated by the RB method. More specifically, the data pair selecting section 13 makes the generating section that generates the data pair using the RB method generate one set of data pairs and output the generated data pairs to the hyperplane learning section 14.

Further, when the value of "a1" is smaller than the sigmoid function "f_1", the value of "a2" is equal to or larger than the value of "f_2", or a value of "a3" is larger than the value of the sigmoid function "f_3", the data pair selecting section 13 adopts the data pair generated by the NN method. More specifically, the data pair selecting section 13 makes the generating section that generates the data pair using the NN method generate one set of data pairs and output the generated data pairs to the hyperplane learning section 14.

The data pair selecting section 13 repeatedly executes the above-descried processing by the number corresponding to Npair. As a result, the data pair selecting section 13 can select the data pairs generated by the generation methods at a ratio according to the number of the statistical properties stored in the learning data storage section 11 and output the selected data pairs to the hyperplane learning section 14.

The hyperplane learning section 14 learns the optimized hyperplane using the data pairs received from the generating sections 12a to 12c. For example, the hyperplane learning section 14 receives a set of the positive and negative example pairs from each of the generating sections 12a to 12c. When the number of the received data pairs reaches a predetermined value, i.e., "Npair", the hyperplane learning section 14 uses the received data pairs to learn the optimized hyperplane.

For example, the hyperplane learning section 14 uses, as an evaluation value, a sum of the number of the positive example pairs that have not been disposed at different areas as a result of division by randomly set hyperplane and the number of the negative example pairs that have not been disposed at different areas as a result of division by the hyperplane. Then, the hyperplane learning section 14 randomly changes a position of the hyperplane using a predetermined algorithm to calculate once again the evaluation value.

After repeatedly executing such processing by a predetermined number of times, the hyperplane learning section 14 regards a hyperplane having the highest evaluation value as the optimized hyperplane. Thereafter, the hyperplane learning section 14 generates a matrix in which each row vector is the normal vector of the optimized hyperplane, i.e., a conversion matrix and notifies the binary converting section 23 of the generated conversion matrix.

The following describes processing to be executed by the information retrieval device 20. The retrieval-target database storage section 21 stores retrieval-target data, i.e., the feature amount vector of the registered biological data. Specifically, the retrieval-target database storage section 21 stores the same data as that stored in the learning data storage section 11. Note that the retrieval-target database storage section 21 may store more data including the data stored in the learning data storage section 11.

The binary database storage section 22 stores a binary symbol obtained by converting the feature amount vector using a predetermined conversion matrix and data ID before conversion in association with each other.

When receiving the conversion matrix from the hyperplane learning section 14 of the information conversion device 10, the binary converting section 23 uses the received conversion matrix to convert the feature amount vector stored in the retrieval-target database storage section 21 into a binary string. Then, the binary converting section 23 stores the obtained binary string and data ID associated with the feature amount vector of the conversion source in the binary database storage section 22 in association with each other.

The retrieval processing section 24 receives query data from the client device 2, extracts the feature amount vector indicating a feature amount of the received query data, and converts the extracted feature amount vector into a binary string using a predetermined conversion matrix. Then, the retrieval processing section 24 retrieves binary strings with a hamming distance equal to or smaller than a predetermined value from binary strings stored in the binary database storage section 22, i.e., binary strings of the feature amount vectors which become neighborhood candidates of the query data.

Thereafter, the retrieval processing section 24 acquires, from the retrieval-target database storage section 21, the feature amount vectors which are conversion sources of the retrieved binary strings. Then, the retrieval processing section 24 executes the following processing when, among the feature amount vectors thus acquired, feature amount vectors identical to the feature amount vectors extracted from the query data are found or a feature amount vector having a Euclidean distance therefrom equal to or smaller than a predetermined threshold is found. That is, the retrieval processing section 24 transmits, to the client device 2, a notification indicating that the query data is identical to the registered biological data.

On the other hand, the retrieval processing section 24 executes the following processing when, among the feature amount vectors thus acquired, feature amount vectors identical to the feature amount vectors extracted from the query data are not found or a feature amount vector having a Euclidean distance therefrom equal to or smaller than a predetermined threshold is not found. That is, the retrieval processing section 24 transmits, to the client device 2, a notification indicating that the query data is not identical to the registered biological data. As a result, the client device 2 can perform biometric authentication of a user who has input the query data.

The generating sections 12a to 12c, the data pair selecting section 13, the hyperplane learning section 14, the binary converting section 23, and the retrieval processing section 24 are, for example, electronic circuits. An integrated circuit such as an ASIC (Application Specific Integrated Circuit) or an FPGA (Field Programmable Gate Array), a CPU (Central Processing Unit), or an MPU (Micro Processing Unit) is applied here as an example of such an electronic circuit.

Further, the learning data storage section 11, the retrieval-target database storage section 21, and the binary database storage section 22 are storage devices such as semiconductor memory device such as RAM (Random Access Memory) or flash memory, a hard disk, or an optical disk.

Figure 6:
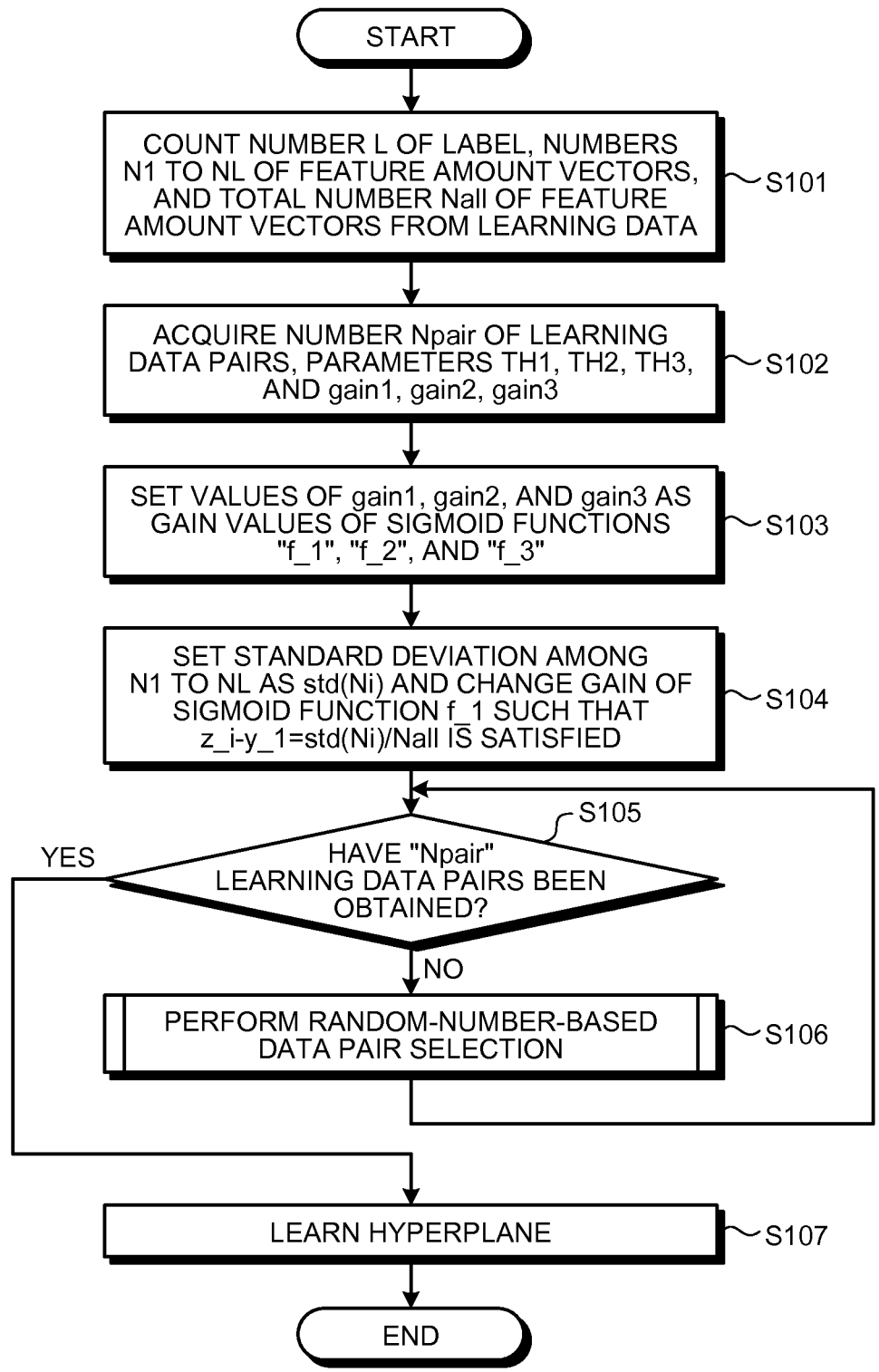
FIG. 6 is a flowchart for explaining a flow of processing to be executed by the information conversion device.

The following describes, using FIGS. 6 to 9, a flow of the processing to be performed in the information conversion device 10. First, with reference to FIG. 6, content of the processing to be executed by the information conversion device 10 will be described. FIG. 6 is a flowchart for explaining a flow of the processing to be executed by the information conversion device.

First, the information conversion device 10 counts the number "L" of types of the label added to the feature amount vectors stored in the learning data storage section 11, the numbers "N1" to "NL" of feature amount vectors added with the label, and a total number "Nall" of feature amount vectors (step S101). Then, the information conversion device 10 acquires values of: three parameters "TH1", "TH2", "TH3"; three gains "gain1", "gain2", "gain3"; and "Npair" indicating the number of data pairs (step S102).

Then, the information conversion device 10 prepares the three sigmoid functions "f_1", "f_2", and "f_3" and sets the values of "gain1", "gain2", and "gain3" as the gain values of the sigmoid functions "f_1", "f_2", and "f_3", respectively (step S103). Further, the information conversion device 10 sets the standard deviation among the counted "N1" to "NL" as "std(Ni)" and changes the gain of the sigmoid function "f_1" such that the sigmoid function "f_1" satisfies "z_i−y_1=std(Ni)/Nall" (step S104).

Subsequently, the information conversion device 10 determines whether or not "Npair" learning data pairs have been obtained (step S105). When the "Npair" learning data pairs have not been obtained (No in step S105), the information conversion device 10 executes random-number-based data pair selection processing (step S106). On the other hand, when the "N pair" learning data pairs have been obtained (Yes in step S105), the information conversion device 10 uses the data pairs to learn the hyperplane (step S107) and ends this routine.

Figure 7:
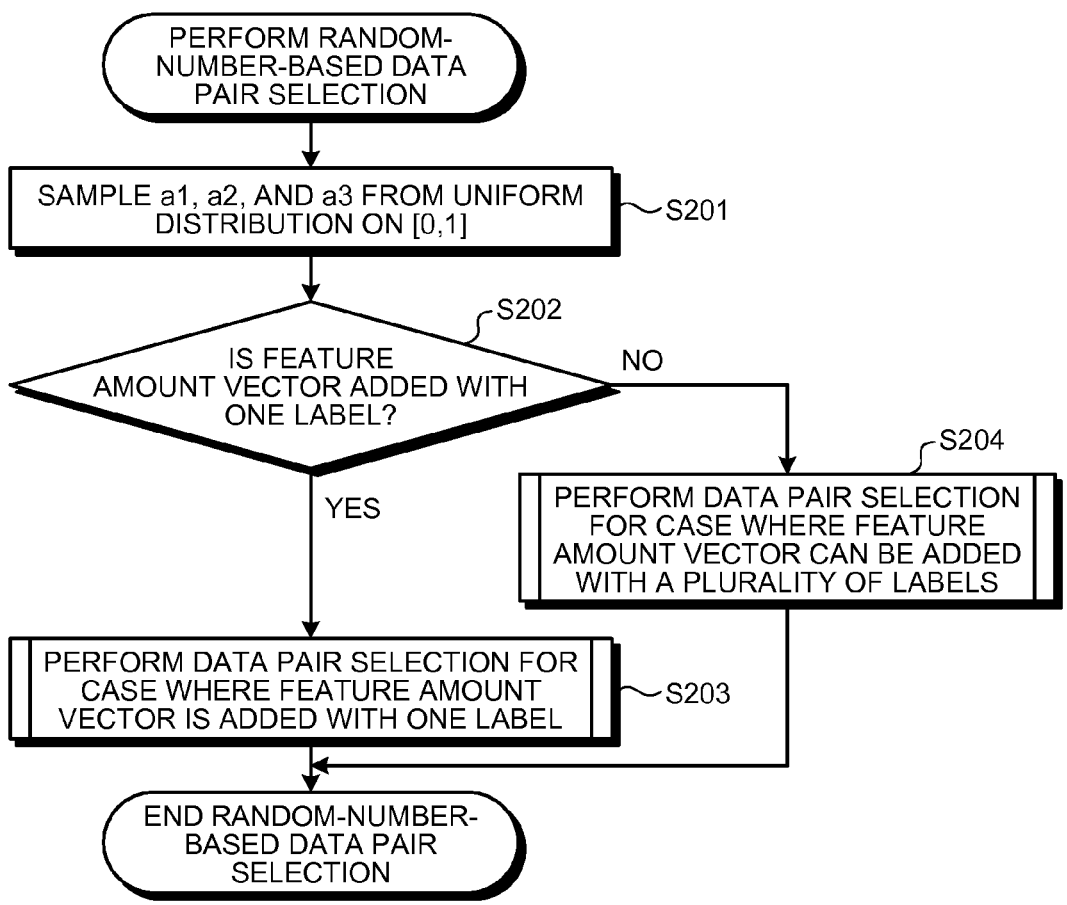
FIG. 7 is a flowchart for explaining a flow of random-number-based data pair selection processing.

The following describes, using FIG. 7, the random-number-based data pair selection processing executed in step S106 in FIG. 6. FIG. 7 is a flowchart for explaining a flow of the random-number-based data pair selection processing. First, the information conversion device 10 samples the three values "a1", "a2", and "a3" from the uniform distribution on [0, 1] (step S201). Then, the information conversion device 10 determines whether or not each of the feature amount vectors stored in the learning data storage section 11 is added with one label (step S202).

When each feature amount vector is added with one label (Yes in step S202), the information conversion device 10 executes data pair selection processing for a case where each feature amount vector is added with one label (step S203). On the other hand, when each feature amount vector is added with a plurality of labels (No in step S202), the information conversion device 10 executes data pair selection processing for a case where each the feature amount vector can be added with a plurality of labels (step S204). After executing the above selection processing, the information conversion device 10 ends the random-number-based data pair selection processing.

Figure 8:
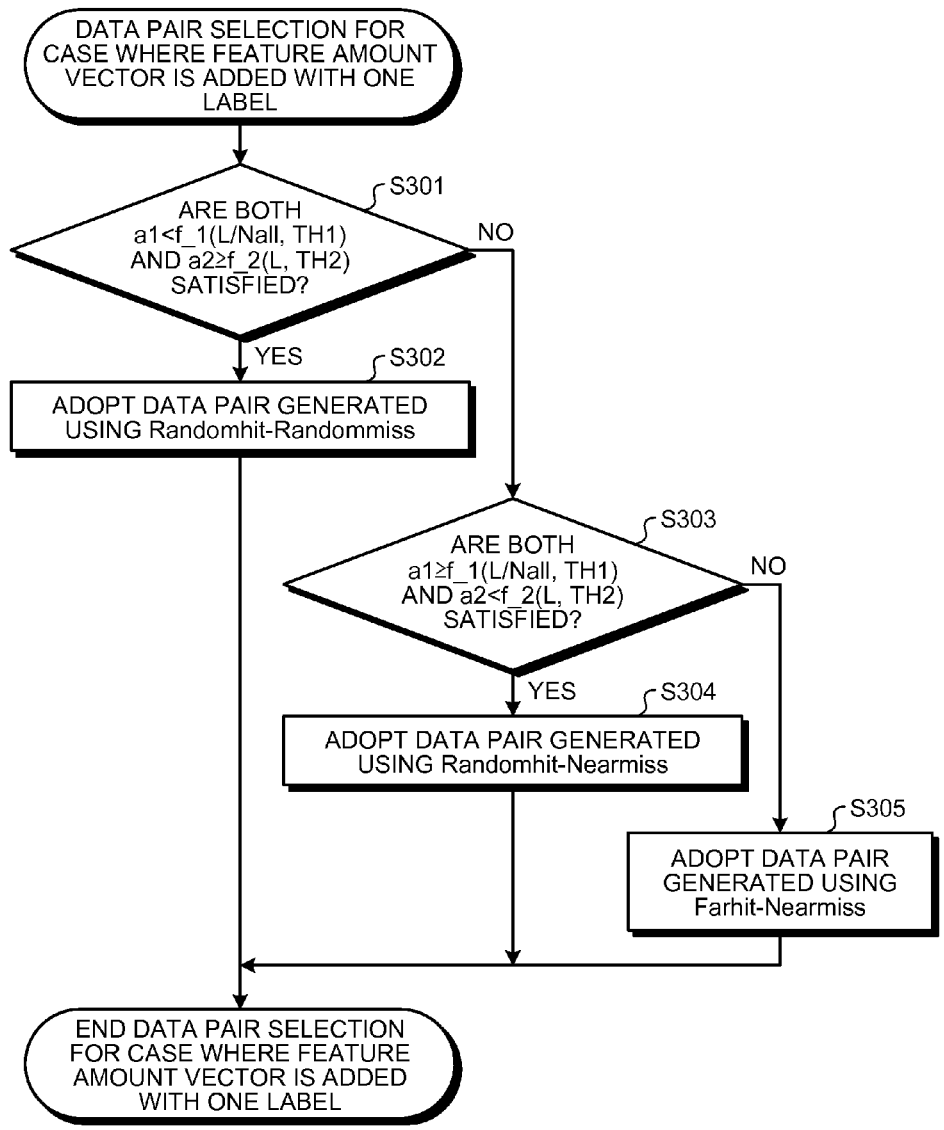
FIG. 8 is a flowchart for explaining a flow of data pair selection processing for a case where the feature amount vector is added with one label.

The following describes, using FIG. 8, a flow of the data pair selection processing for a case where the feature amount vector is added with one label which is executed in step S203 of FIG. 7. FIG. 8 is a flowchart for explaining a flow of the data pair selection processing for a case where the feature amount vector is added with one label.

First, the information conversion device 10 calculates a value of the sigmoid function "f_1" having "L/Nall" as the first argument and "TH1" as the second argument and a value of the sigmoid function "f_2" having "L" as the first argument and "TH2" as the second argument. Then, the information conversion device 10 determines whether the sigmoid function "f_1" is larger than "a1" and a value of "a2" is equal or larger than the value of "f_2" (step S301).

When the sigmoid function "f_1" is larger than "a1" and a value of "a2" is equal or larger than the value of "f_2" (Yes in step S301), the information conversion device 10 adopts the data pair generated by the RR method (step S302). On the other hand, when the sigmoid function "f_1" is not larger than "a1" or the value of "a2" is not equal to or larger than the value of "f_2" (No in step S301), the information conversion device 10 executes the following processing.

That is, the information conversion device 10 determines whether "a1" is equal to or larger than the value of the sigmoid function "f_1" and value of "a2" is smaller than the value of "f_2" (step S303). Then, when "a1" is equal to or larger than the value of the sigmoid function "f_1" and value of "a2" is smaller than the value of "f_2" (Yes in S303), the information conversion device 10 adopts the data pair generated by the RN method (step S304).

Further, when "a1" is not equal to or larger than the value of the sigmoid function "f_1" or value of "a2" is not smaller than the value of "f_2" (No in step S303), the information conversion device 10 executes the following processing. That is, the information conversion device 10 adopts the data pair generated by the FN method (step S305). Further, when adopting the data pair in step S302, step S304, or step S305, the information conversion device 10 ends the data pair selection processing for a case where the feature amount vector is added with one label.

Figure 9:
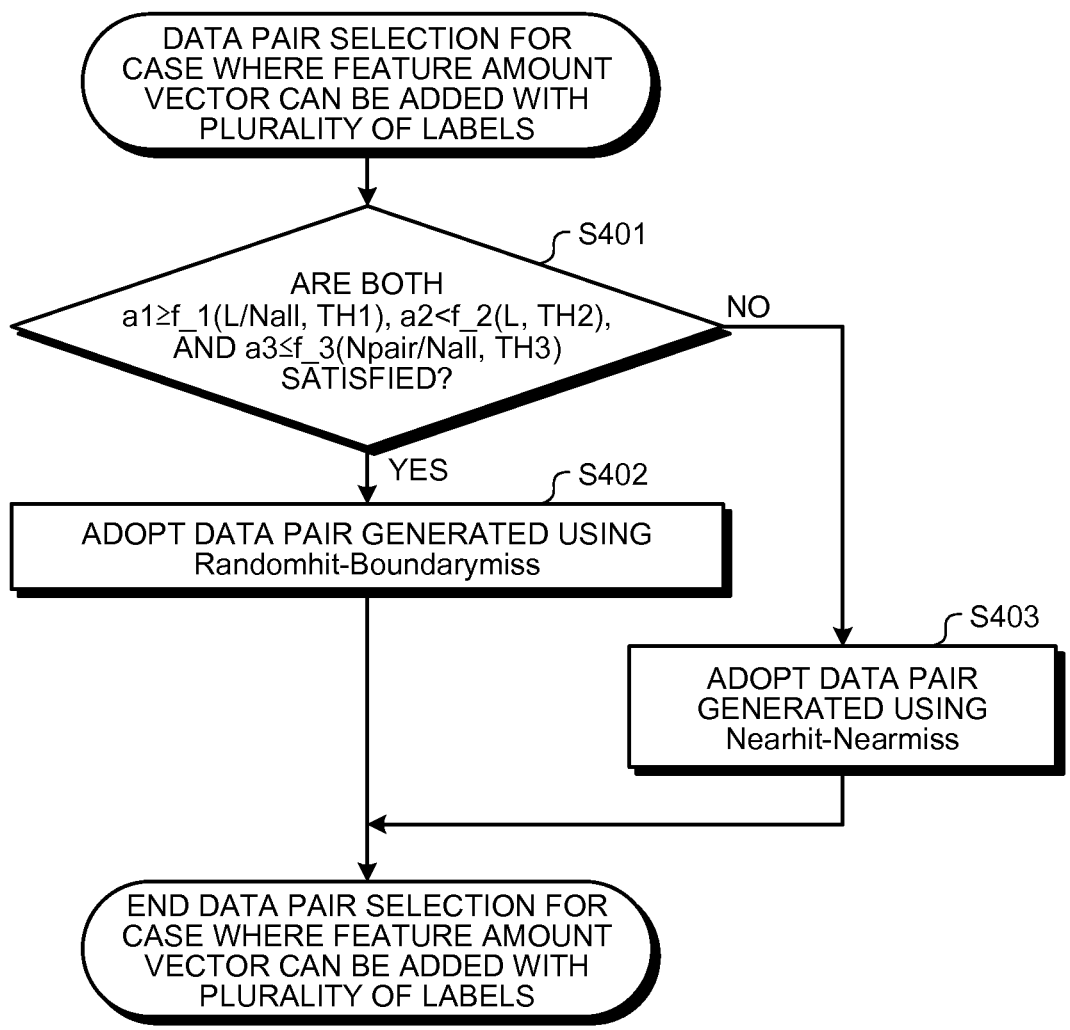
FIG. 9 is a flowchart for explaining a flow of data pair selection processing for a case where the feature amount vector can be added with a plurality of labels.

The following describes, using FIG. 9, a flow of the data pair selection processing for a case where the feature amount vector can be added with a plurality of labels which is executed in step S204 of FIG. 7. FIG. 9 is a flowchart for explaining a flow of the data pair selection processing for a case where the feature amount vector can be added with a plurality of labels.

First, the information conversion device 10 calculates a value of the sigmoid function "f_1" having "L/Nall" as the first argument and "TH1" as the second argument and a value of the sigmoid function "f_2" having "L" as the first argument and "TH2" as the second argument. Further, the information conversion device 10 calculates a value of the sigmoid function "f_3" having "Npair/Nall" as the first argument and "TH3" as the second argument. Then, the information conversion device 10 determines whether the value of "a1" is equal to or larger than the sigmoid function "f_1", the value of "a2" is smaller than the value of "f_2", and a value of "a3" is equal to or smaller than the value of the sigmoid function "f_3" (step S401).

When the value of "a1" is equal to or larger than the sigmoid function "f_1", the value of "a2" is smaller than the value of "f_2", and a value of "a3" is equal to or smaller than the value of the sigmoid function "f_3" (Yes in step S401), the information conversion device 10 executes the following processing. That is, the information conversion device 10 adopts the data pair generated by the RB method (step S402).

On the other hand, when the value of "a1" is smaller than the sigmoid function "f_1", the value of "a2" is equal to or larger than the value of "f_2", or a value of "a3" is larger than the value of the sigmoid function "f_3" (No in step S401), the information conversion device 10 executes the following processing. That is, the information conversion device 10 adopts the data pair generated by the NN method (step S403). After executing the processing of step S402 or step S403, the information conversion device 10 ends the data pair selection processing for a case where the feature amount vector is added with a plurality of labels.

[Effect of Information Conversion Device 10]

As described above, the information conversion device 10 counts the number of labels added to each feature amount vector, the number of types of the label added to all the feature amount vectors, the number of feature amount vectors added with the same label, and the number of data pairs used in the learning of the hyperplane. According to a result of the counting, the information conversion device 10 selects one or more generation methods from a plurality of generation methods that generate the learning data pairs. The information conversion device 10 uses the selected generation method to generate the data pairs and used the generated data pairs to learn the hyperplane.

Thus, the information conversion device 10 can select, according to the statistical property of the feature amount vector, the data pairs for learning the hyperplane that classifies data with high accuracy. As a result, the information conversion device 10 can learn an optimum hyperplane by using the data pairs generated by the optimum generation method according to the statistical property of the feature amount vector.

Further, the information conversion device 10 selects, at a ratio according to the counting result, the data pairs generated by the generation methods and uses the selected data pairs to learn the hyperplane. Thus, even in a case where a feature amount vector having a property different from the label of the feature amount vector used in the learning is added, it is possible that the information conversion device 10 learns a hyperplane whose classification performance does not degrade.

Further, the information conversion device 10 selects, according to a ratio based on each counted statistical property, the generation methods that generate the data pairs and uses the selected generation methods to generate the data pairs. The ratio based on each statistical property includes a ratio based on the number of labels added to each feature amount vector, a ratio based on the number of types of the label, a ratio based on the number of feature amount vectors added with the same label, and a ratio based on the number of learning data pairs. Thus, the information conversion device 10 can generate a conversion matrix using the data pairs generated by the generation methods selected at an appropriate ratio.

Further, the information conversion device 10 calculates, using a predetermined function, a ratio of the number of the data pairs to be generated by each of the generation methods to the total number of data pairs to be used. The predetermined function is a predetermined function whose value is defined by the first argument and second argument, in which the value for the first argument is monotonously non-decreasing such that it becomes 0 when the first argument is negative infinity and becomes 1 when the first argument is positive infinity. Further, the predetermined function is a function in which a lower limit of the first argument for which the value is equal to or larger than ½ is defined as the second argument. The information conversion device 10 inputs a counted value of each statistical property as the first argument and calculates a ratio of the number of the data pairs to be generated by each of the generation methods to the total number of data pairs to be used.

Thus, even in a case where a feature amount vector having a property different from the label of the feature amount vector used in the learning is added, the information conversion device 10 can previously set a hyperplane whose classification accuracy is robust.

Further, the information conversion device 10 generates the learning data pairs using the RR method, FN method, RN method, RB method, or NN method. Thus, the information conversion device 10 can set a hyperplane that classifies the feature amount vectors having various statistical properties for each label.

Further, for the feature amount vectors each added with one label, the information conversion device 10 increases the number of data pairs generated by the RR method or FN method as the number of feature amount vectors added with the same label is smaller and the number of feature amount vectors added with the same label is larger. Further, for the feature amount vectors each added with one label, the information conversion device 10 increases the number of data pairs generated by the RN method as the number of feature amount vectors added with the same label is larger and the number of feature amount vectors added with the same label is smaller. Further, for the feature amount vectors each added with a plurality of labels, the information conversion device 10 increases the number of data pairs generated by the RN method as the number of feature amount vectors added with the same label is larger, the number of feature amount vectors added with the same label is smaller, and the number of data pairs used in learning is larger. Further, the information conversion device 10 sets the data pairs generated by the NN method as the remainder data pairs.

Thus, the information conversion device 10 can generate the data pairs generated by the generation methods at an appropriate ratio according to the statistical property of the feature amount vector. As a result, the information conversion device 10 can set a hyperplane according to the statistical property of the feature amount vector, thus making it possible to increase accuracy with which the hyperplane classifies the feature amount vectors for each label.

Second Embodiment

Although one embodiment according to the present invention is described above, embodiments other than the above described embodiment may be implemented in many different forms. Accordingly, another embodiment included in the present invention will be described below as a second embodiment.

(1) Function to Calculate Ratio

The information conversion device 10 described above uses, as the function that satisfies a predetermined requirement, the sigmoid function to calculate a ratio of the number of the data pairs to be generated by each of the generation methods to the total number of data pairs to be used; however, embodiments are not limited to this. For example, the information conversion device 10 may select a generation method that generate the data pairs according to a ratio calculated using a heavy-side step function (hereinafter, referred to merely as "step function").

Hereinafter, as a variation of the processing to be executed by the information conversion device 10, processing that calculates a ratio of the number of the data pairs generated by each of the generation methods to the total number of data pairs to be used using the step function will be described using a flowchart. Note that the following processing is executed by the data pair selecting section 13 and hyperplane learning section 14 which are provided in the information conversion device 10.

Figure 10:
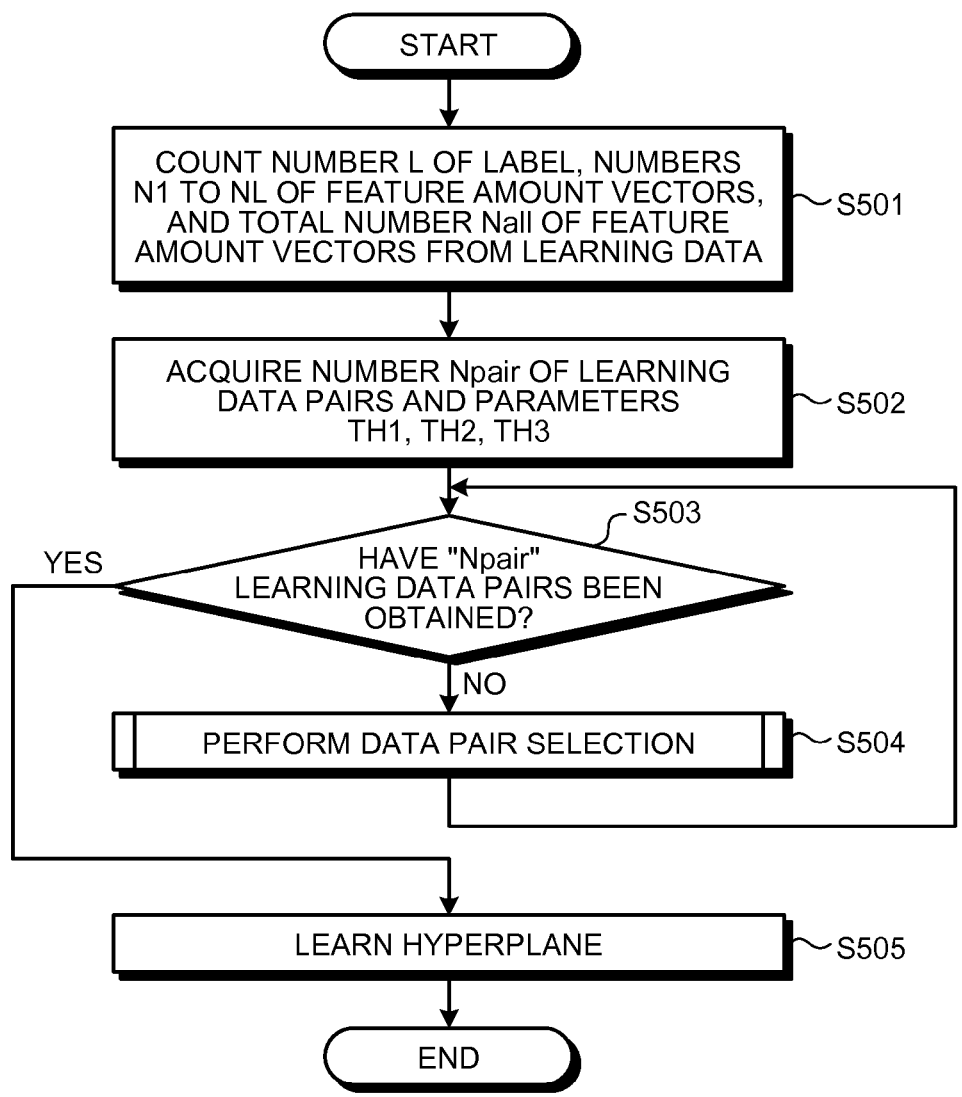
FIG. 10 is a flowchart for explaining a variation of the processing executed by the information conversion device.

First, a variation of the processing to be executed by the information conversion device 10 will be described using FIG. 10. FIG. 10 is a flowchart for explaining a variation of the processing executed by the information conversion device.

First, the information conversion device 10 counts the number "L" of types of the label added to the feature amount vectors stored in the learning data storage section 11, the numbers "N1" to "NL" of feature amount vectors added with the label, and a total number "Nall" of feature amount vectors (step S501). Then, the information conversion device 10 acquires values of: three parameters "TH1", "TH2", "TH3"; and "Npair" indicating the number of data pairs (step S502).

Subsequently, the information conversion device 10 determines whether or not "Npair" learning data pairs have been obtained (step S503). When the "Npair" learning data pairs have not been obtained (No in step S503), the information conversion device 10 executes data pair selection processing (step S504). On the other hand, when the "Npair" learning data pairs have been obtained (Yes in step S503), the information conversion device 10 uses the data pairs to learn the hyperplane (step S505) and ends this routine.

Figure 11:
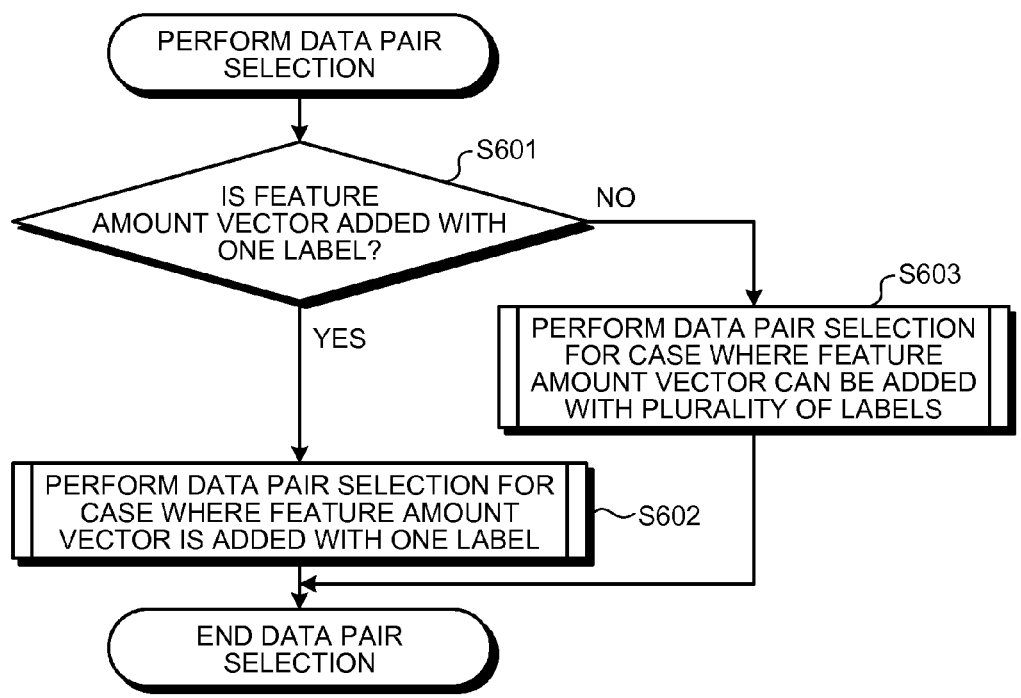
FIG. 11 is a flowchart for explaining a flow of data pair selection processing.

The following describes, using FIG. 11, the data pair selection processing executed in step S504 in FIG. 10. FIG. 11 is a flowchart for explaining a flow of the data pair selection processing. First, the information conversion device 10 whether or not each of the feature amount vectors stored in the learning data storage section 11 is added with one label (step S601).

When each feature amount vector is added with one label (Yes in step S601), the information conversion device 10 executes data pair selection processing for a case where each feature amount vector is added with one label (step S602). On the other hand, when each feature amount vector is added with a plurality of labels (No in step S601), the information conversion device 10 executes data pair selection processing for a case where the feature amount vector can be added with a plurality of labels (step S603). After executing the above selection processing, the information conversion device 10 ends the random-number-based data pair selection processing.

Figure 12:
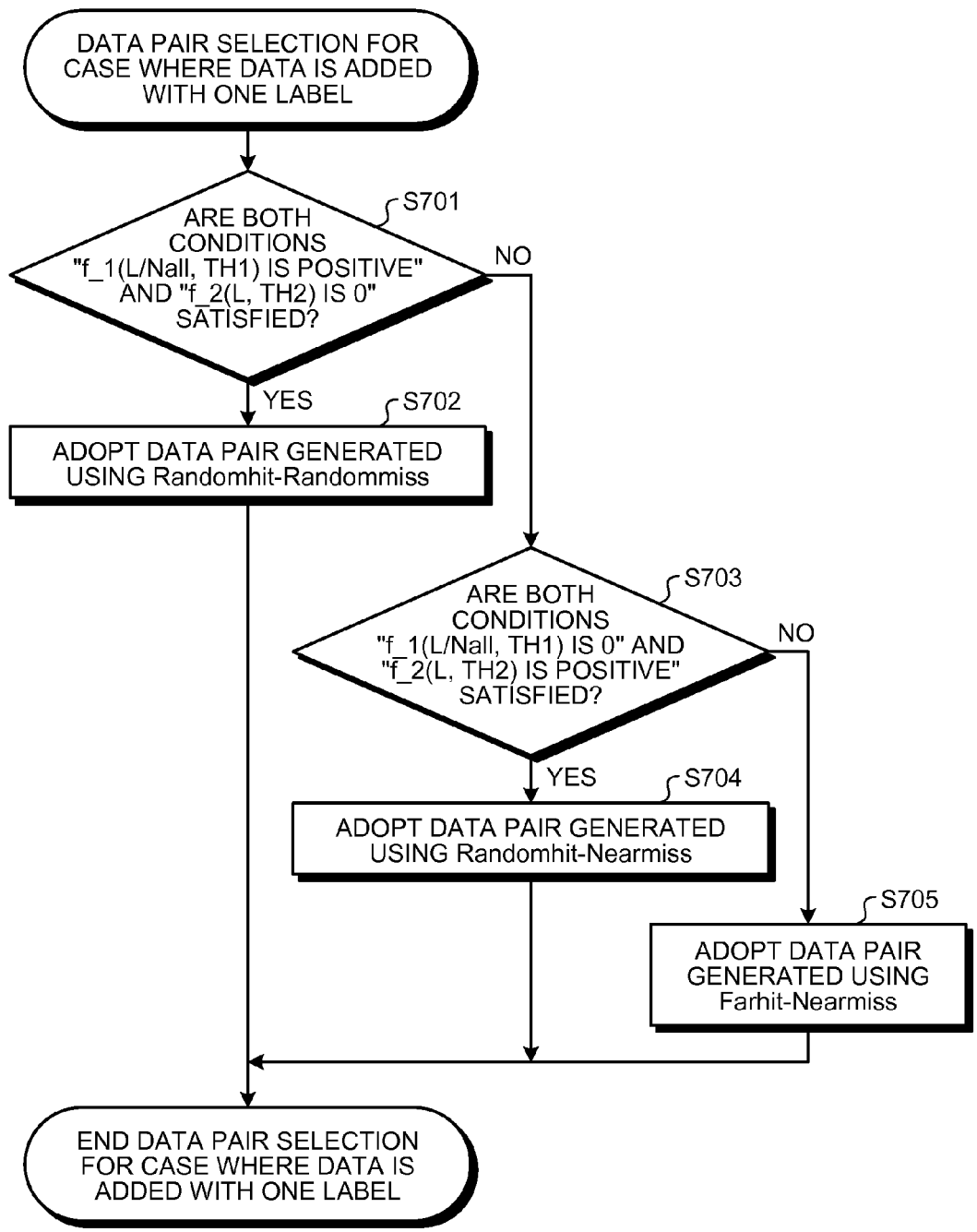
FIG. 12 is a flowchart for explaining a variation of the data pair selection processing for a case where the feature amount vector is added with one label.

The following describes, using FIG. 12, a flow of the data pair selection processing for a case where the feature amount vector is added with one label which is executed in step S602 of FIG. 11. FIG. 12 is a flowchart for explaining a variation of the data pair selection processing for a case where the feature amount vector is added with one label.

First, the information conversion device 10 calculates a value of a step function "f_1" having "L/Nall" as the first argument and "TH1" as the second argument and a value of a step function "f_2" having "L" as the first argument and "TH2" as the second argument. Then, the information conversion device 10 determines whether the value of the step function "f_1" is positive and value of the "f_2" is "0" (step S701).

When the value of the step function "f_1" is positive and value of the "f_2" is "0" (Yes in step S701), the information conversion device 10 adopts the data pair generated by the RR method (step S702). On the other hand, when the value of the step function "f_1" is not positive and value of the "f_2" is not "0" (No in step S701), the information conversion device 10 executes the following processing.

That is, the information conversion device 10 determines whether the value of the step function "f_1" is "0" and value of the "f_2" is positive (step S703). Then, when the value of the step function "f_1" is "0" and value of the "f_2" is positive (Yes in step S703), the information conversion device 10 adopts the data pair generated by the RN method (step S704).

Further, when the value of the step function "f_1" is not "0" or value of the "f_2" is not positive (No in step S703), the information conversion device 10 executes the following processing. That is, the information conversion device 10 adopts the data pair generated by the FN method (step S705). Further, when adopting the data pair in step S702, step S704, or step S705, the information conversion device 10 ends the data pair selection processing for a case where the feature amount vector is added with one label.

Figure 13:
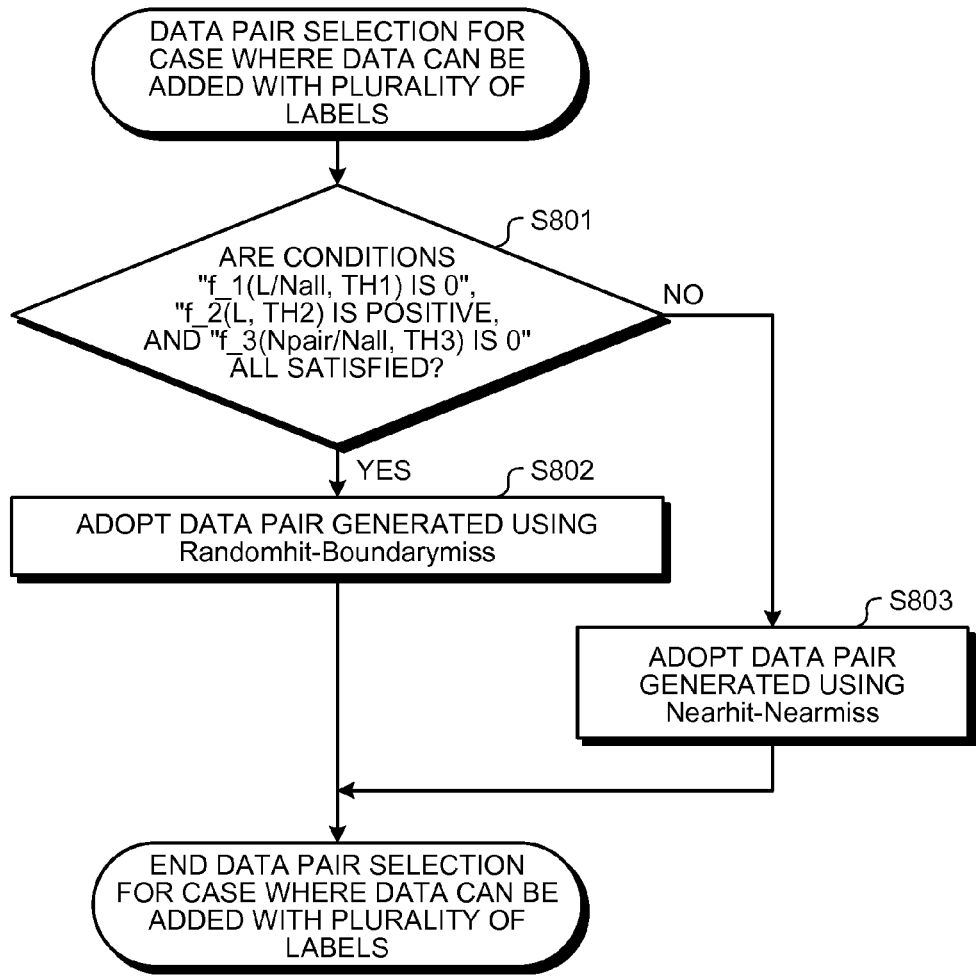
FIG. 13 is a flowchart for explaining a variation of the data pair selection processing for a case where the feature amount vector can be added with a plurality of labels.

The following describes, using FIG. 13, a flow of the data pair selection processing for a case where the feature amount vector can be added with a plurality of labels which is executed in step S603 of FIG. 11. FIG. 13 is a flowchart for explaining a variation of the data pair selection processing for a case where the feature amount vector can be added with a plurality of labels.

First, the information conversion device 10 calculates a value of the step function "f_1" having "L/Nall" as the first argument and "TH1" as the second argument and a value of the step function "f_2" having "L" as the first argument and "TH2" as the second argument. Further, the information conversion device 10 calculates a value of a step function "f_3" having "Npair/Nall" as the first argument and "TH3" as the second argument. Then, the information conversion device 10 determines whether the value of the step function "f_1" is "0", value of the step function "f_2" is positive, and value of the step function "f_3" is "0" (step S801).

When the value of the step function "f_1" is "0", value of the step function "f_2" is positive, and value of the step function "f_3" is "0" (Yes in step S801), the information conversion device 10 executes the following processing. That is, the information conversion device 10 adopts the data pair generated by the RB method (step S802).

On the other hand, when the value of the step function "f_1" is not "0", value of the step function "f_2" is not positive, or value of the step function "f_3" is not "0" (No in step S801), the information conversion device 10 executes the following processing. That is, the information conversion device 10 adopts the data pair generated by the NN method (step S803). After executing the processing of step S802 or step S803, the information conversion device 10 ends the data pair selection processing for a case where the feature amount vector is added with a plurality of labels.

When using the step function, the information conversion device 10 leans the hyperplane using the data pairs generated by any one of the generation methods. In such a case, the information conversion device 10 can select the generation method according to the statistical property of the feature amount vector without calculating an adequate threshold. As a result, the information conversion device 10 can increase accuracy with which the hyperplane classifies the feature amount vectors.

(2) Selection of Feature Amount Vector

The information conversion device 10 can select the positive and negative example pairs including arbitrary number of the feature amount vectors. Further, the information conversion device 10 acquires, from the learning data storage section 11, a data set including three or more feature amount vectors. Further, the information conversion device 10 may generate the positive and negative example pairs from the acquired data set and calculate a value of an evaluation function using the generated positive and negative example pairs.

Further, the above-described information conversion device 10 may reselect the positive and negative example pairs for every evaluation of the hyperplane. Further, the information conversion device 10 changes the data pair generation method depending on whether each feature amount vector is added with one label or a plurality of labels; however, the embodiments are not limited to this. For example, the information conversion device 10 may calculate a ratio according to the number of the feature amount vectors added with one label and the number of the feature amount vectors added with a plurality of labels and select the data pair generation method according to the calculated ratio.

(3) Embodiments

The information conversion device 10 described above is a device independent of the information retrieval device 20; however, embodiments are not limited to this. For example, functions of the information conversion device 10 may be included in the information retrieval device 20. Alternatively, the information conversion device 10 may include the function to be executed by the binary converting section 23 of the information retrieval device 20, and may generate the conversion matrix to be applied to feature amount vectors stored in the information retrieval device 20 currently in operation and execute processing of generating the binary strings by the application of the generated conversion matrix. Further, the functions of the information conversion device 10 may be exhibited by a so-called cloud system.

(4) Program

Figure 14:
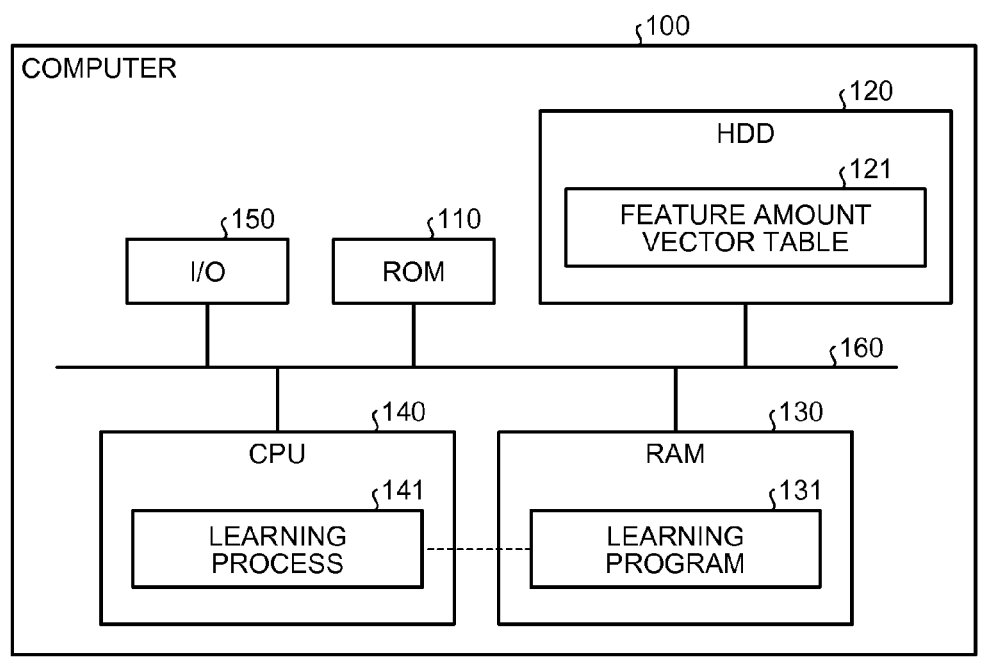
FIG. 14 is a view for explaining an example of a computer that executes a learning program.

Incidentally, the information conversion device 10 according to the first embodiment achieves various processing by using hardware; however, embodiments are not limited to this, and the processing may be achieved by causing a computer included in the information conversion device 10 to execute a previously provided program. Accordingly, an example of a computer that executes a program having the same functions as those of the information conversion device 10 illustrated in the first embodiment will be described below using FIG. 14. FIG. 14 is a view for explaining an example of a computer that executes a learning program.

A computer 100 exemplified in FIG. 14 has ROM (Read Only Memory) 110, a HDD (Hard Disk Drive) 120, RAM (Random Access Memory) 130, and a CPU (Central Processing Unit) 140 connected to one another via a bus 160. Further, the computer 100 exemplified in FIG. 14 includes an I/O (Input/Output) 150 for transmitting and receiving packets.

The HDD 120 stores a feature amount vector table 121 that stores the same data as those stored in the learning data storage section 11. The RAM 130 has a learning program 131 previously stored therein. In the example illustrated in FIG. 14, the CPU 140 reads out the learning program 131 from the RAM 130 and executes this program, so that the learning program 131 starts to function as a learning process 141. Note that the learning process 141 performs the same functions as those performed by each of the generating sections 12a to 12c, the data pair selecting section 13, and the hyperplane learning section 14, which are illustrated in FIG. 1.

Note that implementation of the learning program described in this embodiment is enabled by executing a previously provided program on a personal computer or a workstation. Such a program may be provided via a network such as the Internet. Further, such a program is recorded on a computer-readable recording medium such as a hard disk, a flexible disk (FD), a CD-ROM (Compact Disc Read Only Memory), an MO (Magneto Optical Disc), or a DVD (Digital Versatile Disc). Further, such a program may be executed by being read out from a recoding medium by a computer.

REFERENCE SIGNS LIST

In one aspect, it is possible to select a data pair for learning the hyperplane that classifies the data with high accuracy.

All examples and conditional language provided herein are intended for the pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A learning method of a biometric authentication comprising:
counting any one of or some of a number of labels added to each of feature amount vectors included in a learning data set, a number of types of the labels, a number of feature amount vectors added with a same label, and a number of data pairs used for learning of a hyperplane, by a counter included in an information processing device;
first selecting, according to a result of the counting, one or more data pair generation methods from a plurality of previously stored data pair generation methods that generate the data pairs from the learning data set based on a ratio of the feature amount vectors added with one label, a ratio according to the number of the types of the label, a ratio according to the number of the feature amount vectors added with the same label, and a ratio according to the number of the data pairs used in learning of the hyperplane, by a data pair generation method selector included in the information processing device;
first calculating, using a result of the counting, a ratio of a number of the data pairs to be generated by each of the selected one or more generation methods to a total number of the data pairs to be used, by a calculator included in the information processing device;
generating, using the selected one or more generation methods, the data pairs from the feature amount vectors included in the learning data set, by a data pair generator included in the information processing device;
second selecting, at the calculated ratios, the data pairs generated by the selected one or more generation methods, by a data pair selector included in the information processing device; and
first learning, using the selected data pairs, the hyperplane that divides a feature amount vector space, by a learner included in the information processing device.

2. The learning method of the biometric authentication according to claim 1, further including:
second calculating the ratio of the number of the data pairs to be generated by each of the selected one or more generation methods to the total number of data pairs to be selected by inputting, to a function whose value is defined by a first argument and a second argument, in which the value for the first argument is monotonously non-decreasing such that the value becomes 0 when the first argument is negative infinity and becomes 1 when the first argument is positive infinity and in which a lower limit of the first argument for which the value is equal to or larger than ½ is defined as the second argument, the counting result and a predetermined threshold serving as the first argument or second argument, by the calculator;

third selecting the data pairs generated by the selected one or more generation methods at the calculated ratios, by the data pair generation method selector; and second learning the hyperplane using the selected data pairs, by the learner.

3. The learning method of the biometric authentication according to claim 1, further including third selecting the selected one or more generation methods that generates the data pairs for learning the hyperplane from among first to fifth generation methods, by the data pair generation method selector, the first generation method being a method that generates a pair obtained by randomly selecting from the feature amount vectors added with the same label and a pair obtained by randomly selecting feature amount vectors added with different labels, the second generation method being a method that generates a pair of a feature amount vector that is most distant from a feature amount vector selected as a reference among feature amount vectors added with the same label as the label of the feature amount vector serving as a reference and the feature amount vector serving as a reference and a pair of a feature amount vector that is closest to the feature amount vector serving as a reference among feature amount vectors added with a different label from the label of the feature amount vector serving as a reference and the feature amount vector serving as a reference, the third generation method being a method that generates a pair obtained by randomly selecting from the feature amount vectors added with the same label and a pair of a feature amount vector that is closest to a feature amount vector selected as a reference among feature amount vectors added with a different label from the label of the feature amount vector serving as a reference and the feature amount vector serving as a reference, the fourth generation method being a method that generates a pair obtained by randomly selecting from the feature amount vectors added with the same label and a pair of a reference vector added with a different label from those of feature amount vectors included in a sample set obtained by randomly selecting one or more feature amount vectors and having a minimum generalized mean in terms of distance from the feature amount vectors included in the sample set and a feature amount vector added with a different label from the label of the reference vector, the fifth generation method being a method that generates a pair of a feature amount vector that is closest to a feature amount vector selected as a reference among feature amount vectors added with the same label as the label of the feature amount vector serving as a reference and the feature amount vector serving as a reference and a pair of a feature amount vector that is closest to the feature amount vector serving as a reference among feature amount vectors added with a different label from the label of the feature amount vector serving as a reference and the feature amount vector serving as a reference.

4. The learning method of the biometric authentication according to claim 3, wherein for the feature amount vectors each added with one label, the number of data pairs generated by the first generation method or second generation method is increased as the number of feature amount vectors added with the same label is smaller and the number of feature amount vectors added with the same label is larger, for the feature amount vectors each added with one label, the number of data pairs generated by the third generation method is increased as the number of feature amount vectors added with the same label is larger and the number of feature amount vectors added with the same label is smaller, for the feature amount vectors each added with a plurality of labels, the number of data pairs generated by the fourth generation method is increased as the number of feature amount vectors added with the same label is larger, the number of feature amount vectors added with the same label is smaller, and the number of data pairs used in learning the hyperplane is larger, and the data pairs generated by the fifth generation method are selected as the remainder data pairs.

5. An information processing device for a biometric authentication comprising:

a data pair generator configured to generate, using different generation methods, data pairs from feature amount vectors included in a learning data set;

a counter configured to count any one of or some of a number of labels added to each of the feature amount vectors included in the learning data set, a number of types of the labels, a number of feature amount vectors added with a same label, and a number of data pairs used for learning of a hyperplane;

a data pair generation method selector configured to select, according to a result of the counting, one or more generators that generate the data pairs from the learning data set based on a ratio of the feature amount vectors added with one label, a ratio according to the number of the types of the label, a ratio according to the number of the feature amount vectors added with the same label, and a ratio according to the number of the data pairs used in learning of the hyperplane;

a calculator configured to calculate, , using a result of the counting, a ratio of a number of the data pairs to be generated by each of the selected one or more generators to a total number of the data pairs to be used, a data pair selector configured to select, at the calculated ratios, the data pairs generated by the selected one or more generators; and a learner configured to learn, using the selected data pairs selected by the data pair selector, the hyperplane that divides a feature amount vector space.

6. A non-transitory computer-readable recording medium storing a learning program that causes a computer to execute a biometric authentication comprising:

counting any one of or some of a number of labels added to each of feature amount vectors included in a learning data set, a number of types of the labels, a number of feature amount vectors added with a same label, and a number of data pairs used for learning of a hyperplane;

first selecting, according to a result of the counting, one or more data pair generation methods from a plurality of previously stored data pair generation methods that generate the data pairs from the learning data set based on a ratio of the feature amount vectors added with one label, a ratio according to the number of the types of the label, a ratio according to the number of the feature amount vectors added with the same label, and a ratio according to the number of the data pairs used in learning of the hyperplane;

calculating, using a result of the counting, a ratio of a number of the data pairs to be generated by each of the selected one or more generation methods to a total number of the data pairs to be used;
generating, using the selected one or more generation methods, the data pairs from the feature amount vectors included in the learning data set;
second selecting, at the calculated ratios, the data pairs generated by the selected one or more generation methods; and
learning, using the generated data pairs, the hyperplane that divides a feature amount vector space.

* * * * *